US005463566A

United States Patent [19]

Marrucci et al.

[11] Patent Number: 5,463,566

[45] Date of Patent: Oct. 31, 1995

[54] PREPROCESSOR FOR DETECTION OF PUNCTIFORM SOURCES IN INFRARED SCENARIOS

[75] Inventors: Paolo Marrucci, Morena; Germano Sgarzi, Rome; Fabio Vitale, Ostia, all of Italy

[73] Assignee: Alenia Aeritalia & Selenia S.p.A., Rome, Italy

[21] Appl. No.: 357,045

[22] Filed: Dec. 13, 1994

Related U.S. Application Data

[63] Continuation of Ser. No. 934,175, Aug. 21, 1992, abandoned.

[30] Foreign Application Priority Data

Aug. 21, 1991 [IT] Italy ................................ RM91A0625

[51] Int. Cl.$^{6}$ ...................................................... G01S 17/02

[52] U.S. Cl. ........................ 364/516; 340/825.49; 342/53; 250/203.1

[58] Field of Search ........................ 364/516; 340/825.49, 340/556; 342/53; 356/51, 141.1, 141.2; 359/154; 250/203.1, 203.6, 398

[56] References Cited

U.S. PATENT DOCUMENTS

| | | | |
|---|---|---|---|
| 4,319,332 | 3/1982 | Mehnert | 364/516 |
| 4,585,948 | 4/1986 | Schneider et al. | 364/516 |
| 4,855,932 | 8/1989 | Cangiani et al. | 364/516 |
| 4,860,216 | 8/1989 | Linsenmayer | 364/516 |
| 4,864,515 | 9/1989 | Deck | 364/516 |

*Primary Examiner*—Ellis B. Ramirez
*Assistant Examiner*—Thomas Peeso
*Attorney, Agent, or Firm*—Herbert Dubno

[57] ABSTRACT

Preprocessor for the detection of point sources in an infrared (IR) "scenario" or field, essentially consisting of an input interface; a transversal filter; an adaptable threshold device, consisting in turn of a two-port internal memory and of an arithmetic processing unit; a resource assembly and an output interface. The system can be used in surveillance in the IR band, more particularly, in the field of detection of signal emission on ships, planes, helicopters, transportation means, armored cars, airports and anywhere it is necessary to detect artificial or natural heat sources from as far away as possible. In comparison with the prior art, the preprocessor differs from the point of view of the filtering system, adjusting the filter itself to the real form of the IR signal which is punctiform and depends on the electro-optic characteristics of the sensor.

3 Claims, 2 Drawing Sheets

PREPROCESSOR FOR DETECTION OF PUNCTIFORM SOURCES IN INFRARED SCENARIOS

This is a continuation of application Ser. No. 07/934,175 filed on Aug. 21, 1992 now abandoned.

FIELD OF THE INVENTION

The present invention relates to a preprocessor for the detection of punctiform (point) sources in an infrared (IR) scenario, especially for an IR surveillance system. More particularly, the invention relates to detection of punctiform sources with electronic systems installed on ships, airplanes, helicopters, airports, armored cars and the like, i.e. wherever it is necessary to detect punctiform IR sources, especially artificial heat sources, at the greatest possible distance.

BACKGROUND OF THE INVENTION

A "preprocessor" as that term is used here, is an electronic signal processor for an IR surveillance system which is capable of reducing the data flow from a "scenario" i.e. the portion of space within which the surveillance system operates, namely, the data obtained by the IR sensor or sensors from the detection field.

Up to now, the traditional systems do not combine a high degree of processing capacity, such as that required to detect punctiform sources in passive panoramic surveillance, and a satisfactory level of hardware integration. The processing flow requires the preprocessor to perform a so-called preliminary detection.

Subsequently, the entire detection process is completed by one or more microprocessors and by computers receiving the data coming from the output of the preprocessor, i.e. from preliminary processing, and then furnishing the data to the operator, or to an automatic aiming or sighting system in the form of the coordinates of the punctiform sources of interest as possible targets.

OBJECTS OF THE INVENTION

It is an object of the invention to provide an improved preprocessor for an electronic IR surveillance system which is more effective than earlier systems and capable of overcoming drawbacks of the prior art.

Another object is to provide an improved system for detecting punctiform (point) heat sources in a detection field.

SUMMARY OF THE INVENTION

These objects are attained with a preprocessor for use in electronic apparatus of the type described which comprises an input interface, a transversal or transverse filter, an adaptable threshold device, an assembly of resources and an output interface.

According to the invention, the adaptable threshold device comprises an internal memory and an arithmetic processing unit along with other generally known circuit elements.

The assembly of resources can be a complex of counters, comparators, etc., to be used by the external controller. The output interface is capable, according to the invention, of acquiring angular reference data.

The preprocessor can be a chip capable of presenting a calculated integration in less than sixty thousand cells. It can, for example, be considered a CHIP-ASIC and can be best utilized when placed in a receiver capable of detecting false alarms at a constant rate (CFAR). Preferably the preprocessor is used primarily in civil and military devices for passive surveillance.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
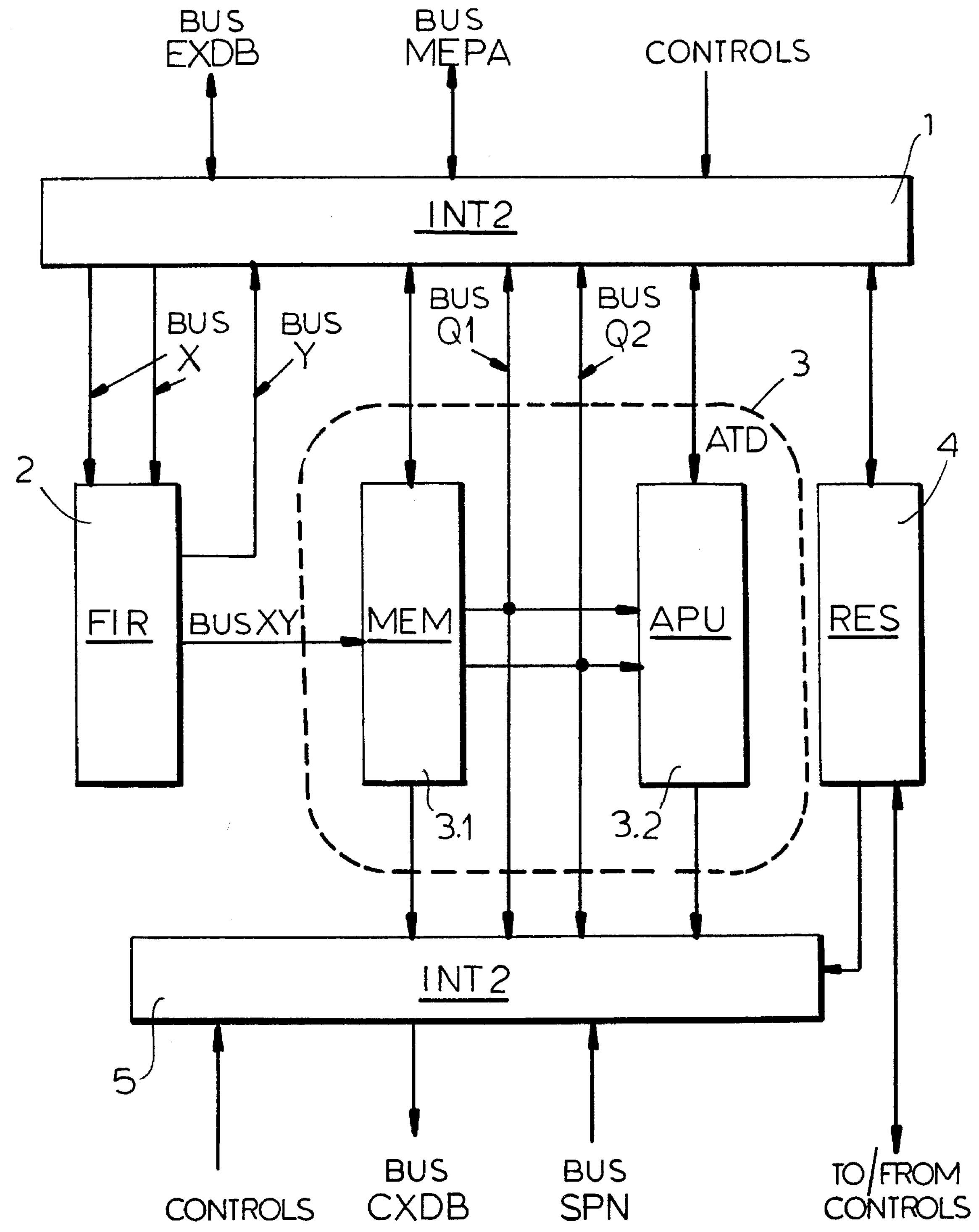
FIG 1 is a block diagram of the preprocessor.

FIG. 1 is a block diagram of the preprocessor which shows an interface input (INT1) 1 receiving the programming, data, and control signal buses EXDB, MEPA and "controls", respectively.

Connerted thereto by input and output buses x and y respectively, is a transversal filter 2 (FIR).

The filter FIR 2 provides a finite pulse response (impulse response of the finite type).

The interface (INT1) 1 is also connected to an adaptable threshold device (ATD) 3 which in turn consists of an internal two-port memory (MEM) 3.1, with which the bus xy and the buses Q1 and Q2 communicate and an arithmetic processing unit (APU) 3.2 which addresses itself to the memory MEM via ports Q1 and Q2. Connected by another bus, not separately designated, is an assembly 4 of resources (RES) which, in turn, communicates with an output interface 5 (INT2) which addresses itself to the ports Q1 and Q2 of memory MEM and communicates with buses including the output bus CXDB, the angular reference bus SPN and another control signal bus.

The entire preprocessor circuitry as described is integrated on a single chip. The interface 1 (INT1) manages the control and programming bus of the entire device (bus EXDB) and the input data bus (bus MEPA). Through bus EXDB it is possible to calculate the internal functions, to program the performing of tests, to read the status and to read the intermediate results of the internal calculation chain. The FIR 2 is a classic digital filter capable of carrying out four operations of addition/substraction on data of twelve bits. The temporal distances used and the performed operations can be programmed in a certain interval.

The two-port internal memory MEM 3.1 contains a RAM memory (with one writing port and two reading ports) and a series of pointers for targeting of internal locations. The RAM is of the 1 k×14 bit type and allows the storage of sixty four data bits for each of the sixteen channels managed by the system. The memorized data are the output of filter FIR.

The arithmetic programming unit APU 3.2 contains the entire chain of calculation representing the algorithms provided in the device. It comprises numerous programmable functions.

The resource assembly RES 4 contains all kind of resources (counters, comparators, etc.) for the use of external controllers.

The interface INT2 shown at 5 manages the exit bus (bus CXDB), the signals and from the control resources and the recording of data coming on bus SPN. In addition, it contains counters capable of keeping track of the temporary references of extraction packages.

The chip comprises the major part of hardware resources required for the algorithms, which can be used by a microprogrammed external controller. These resources have a high degree of parallelism, in order to optimize the execution times.

The "typical" operational environment provides:

a microprocessor for the programming and testing of the component, a microprogrammed controller for the operative control of the real-time algorithms of the calculation, a buffer memory (typically a FIFO) for the collection of output data.

The salient characteristics can be summarized as follows:

Three external busbars to carry out the tasks of programming/reading of the internal status (bus EXDB with sixteen bits), input data (bus MEPA with twelve bits), output data (bus CXCB with sixteen bits).

Capability to manage up to sixteen independent channels with an internal generator for the codes of the four-bit channel.

Structure with transversal filter (FIR) in order to provide a "signal enhancer" for every channel. Filter FIR is programmable on various widths, with a maximum of twelve delay levels per channel.

Internal two-port memory MEM of 1 k×14 bits, with sixty four locations for every one of the sixteen channels, which stores the output of the filter FIR. The memory is equipped with five pointers which can be programmed and controlled from the outside.

N° times two internal memories FIFO with sixteen locations of seventeen bits, used for salvaging data during threshold calculation.

Internal arithmetic structures for the execution of algorithms, common to all channels.

Logic for control and suppression of the "overflow" generated by the arithmetic structures.

Internal registers for memorizing the values of fixed threshold and fixed interdiction, one for each channel.

An array of registers, counters, comparators for managing status of the external controller.

Internal counter of the sample number of each channel (CDC) and the frame (FRM).

"Control words" and "status words" for the control of operative functions and of testing.

Internal structures for the creation of data in the extracted data packets.

Prearrangement for a "pipeline" processing.

Internal structures for tests (BIT) to be performed with the component plotted on the paper which carries it. The device performs at high speed with to a maximum of sixteen channels filtering operation of the FIR type (with transversal filter) and the subsequent decision test with the adaptable threshold device. The structure and the parameters of the two stages are partially programmable.

Figure 2:
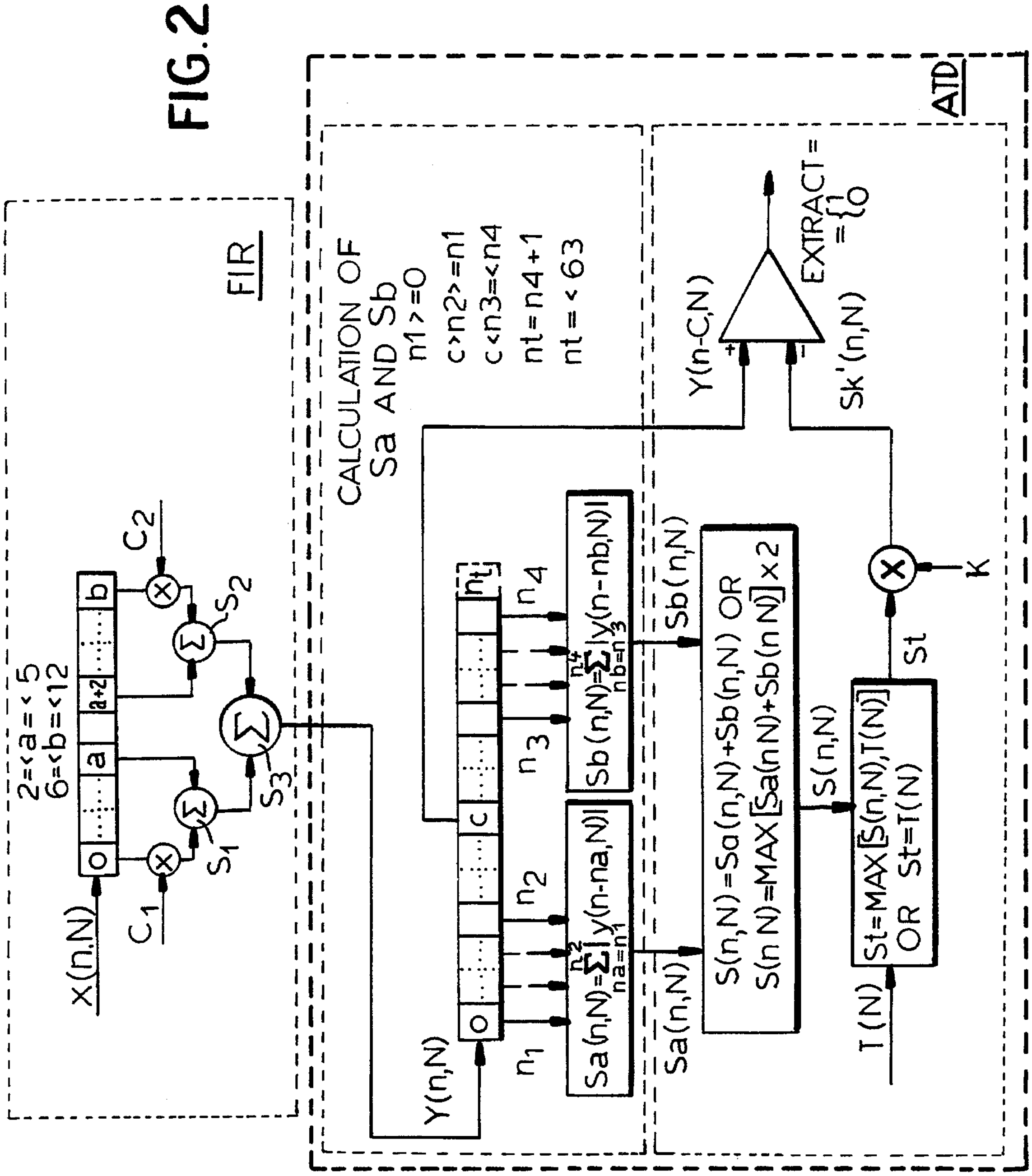
FIG. 2 is a diagram of the circuits FIR and ATD thereof.

To facilitate understanding, reference is made to the functional diagram of FIG. 2, valid for each of the channels N. The raw data enters a transversal, partially programmable filter. The relative output is stored in a two-port memory and used for later processing. The magnitudes or values $S_a$ and $S_b$ are extracted on two different "windows" of partially programmable amplitude and position, as shown in the figure. In the chain of extraction, from the two values of $S_a$ and $S_b$ the value S is obtained which is then compared with an internal fixed threshold value T, preprogrammed into the device, resulting in the definition of a value $S_t$. The latter, multiplied with a constant k, which can be set from the outside, will form the value of the threshold with which will be compared the value C in the two-port memory at the end of the statement or in the presence of a target.

It is to be noted that with previous suitable programming, the values S, $S_a$, $S_b$ can be made available outside the device in question, making possible an accurate estimate (sample number theoretically unlimited) of the inherent noise of each channel. The internal FIR is provided for the calculation of functions of the type:

$$y(n,N)=\{[c1*x(n,N)+x(n-a,-N)]\}+\{[x\ (n-a-2,N)+c2*x(n-b,N)]\}\ (1)$$

$$N=1,2,\ldots,16$$

wherein x(n,N) indicates input data in FIR at the moment of calculation n for channel N. x(n−a, N) instead indicates preceding data passed at a with respect to time n.

The representation uses a 2's complement. The calculations in the first bracket are carried out by the internal adder S1, the calculation in the second are carried out at S2 and the sum total is S3.

The coefficients c1 and c2 can have a value of +1 or −1 and are defined by programming "flags" of the internal "control word".

The parameters a and h express the temporal distance (in periods of the clock applied to FIR) between the used samples ("stoppers") and can be defined by programming flags of the internal control word (see table).

The filter FIR is capable of managing the calculation of function (1) on sixteen different incoming data flows (channels N, N=1, 2 . . . , 16). When a clock is being generated the sample x(n,N) enters the test register, while all the sample previously stored in the filter FIR will shift by one position. The structure is such that at any instant (successive to one clock) on all outputs of filter FIR the samples of a certain channel N are present. In this way following the clock and after the propagation time of FIR, on the bus Y of the output the result of function (1) is obtained for channel N.

The input of filter FIR is a bus in a format of twelve bits in 2's complement. In the output there is no provision for overflows, since the output format comprises all fourteen bits which can be generated by filter FIR.

The internal two-port memory MEM stores the values y() obtained at the output of filter FIR, in order to use them later (in a parallel mode) along the two chains of calculations of the thresholds $S_a$ () and $S_b$ ().

The memory MEM is a RAM of 1 k×14 bits with a write port (D1) and two read ports (Q1 and Q2). Their addresses or particular position within the memory are generated by an assembly of pointers and by the 4 bit channel counter (CHC).

The channel counter CHC divides the RAM in sixteen submodules of sixty four locations (channel buffers), each assigned to one of the sixteen channels managed by the device, which is referred to here as HPPE-16 and which is a trademark.

The single location inside the buffer is determined by six bits sent by the pointers. The five available pointers are provided for the control or targeting of y(t) and of the values y() with fixed temporal distance, generally the ones used in the calculation of $S_a$() and $S_b$().

Any buffer of channel N can function in a circular mode, always maintaining the values of y(t−63,N) and y(t, N), wherein t is the last instance of the calculation of y() for channel N and t-63 refers to sixty three instances of preceding calculations. The circularity implies that at a certain instance t the buffer can be found in a configuration depending on the value t, but always so that the values of y are memorized according to the correspondence increasing time→increasing or ascending direction in circular mode.

The structure of the chain of calculation of $S_a()$ and $S_b()$ is capable of carrying out additions and subscriptions with module on the two distinct "calculation lines" A and B, whose input data (values y) come from the internal two-port memory. The performed operations are the following:

$S_a(O,N)$=SUMMATION $|y(n-n_a,N)|n_a=n_1, \ldots n_2$ $S_b(O,N)$=SUMMATION $|y(n-n_b,N)|n_b=n_3, \ldots n_4$ $S_a(n,N)=|y(n,N)|+S_a(n-1,N)-|y(n-n_2-1,N)|$ $S_b(n,N)=|y(n-n_3,N)|+S_b(n-1,N)-|y(n-n_4-1,N)|$ wherein the values $n_1$, $n_2$, $n_3$, $n_4$ are variable positive numbers which depend on the type of "window" used for the calculation of the partial thresholds $S_a$ and $S_b$. These values are partially programmable. The output values $S_a()$ and $S_b$ sent to the extraction chain are values represented by sixteen bits entirely in complements of two. The internal structure of the chain comprises an input register (RG1), an arithmetic block (MODOP), a FIFO (SF) for intermediate results, an accumulation register (RG2) and an output register (RG3) for each line of calculation. The structure is equipped with an overflow control.

Each line of calculation performs the functions of addition and subtraction in module 2' complement leading back to the following formula:

OUTPUT=ACCUMULATOR +/- |INPUT| wherein:

INPUT=input register (RG1)

ACCUMULATOR=accumulation register (RG2) or internal FIFA (SF)

OUTPUT=OUTPUT REGISTER (RG3)

The method addition/subtraction in the preceding formula is programmable in real time from the microprogrammed external controller. The chain of extractions is capable of effectuating the last calculations of the threshold $S_t()$ and the extraction comparisons according to the following operations. Calculation of the mobile threshold S(n,N) with the option fixed by the flag ILAW12 of the internal control word:

$$ILAW12=0\ S(n,N)=\{[S_a(n,N)+S_b(n,N)]\} \quad (3)$$

$$ILAW12=1\ S(n,N)=MAX\{[S_a(n,N),\ S_b(n,N)]\}\times 2 \quad (4)$$

In function (4) the duplication is performed by a shift of one position to the left of the binary value.

The calculation of the basic threshold $S_t(n,N)$ starting out from S and from the stored fixed threshold T(N), separately for each one of the 16 channels (in the array of registers R6RING). Fixed option with the flag FISMOBL of the internal control word:

$$FISMOBL=0\ S_t(n,N)=MAX\ \{[S(n,N),\ T(N)]\} \quad (5)$$

$$FISMOBL=1\ S_t(n,N)=T(N) \quad (6)$$

Calculation of correct threshold $S_k(n,N)$, using value k stored in an internal register (RG4):

$$S_k(n,N)=k * S_t(n,N) \quad (7)$$

Normalization of the value $S_k$, obtained like this $S_k'(n,N)$ to be used in final comparison which produces the flag EXTRACT, available to the external microprogrammed controller. The comparator establishes the relation (taking into account the sign) the value $S_k(n,N)$ with the central data y(n–C,N) readable in the internal two-port memory:

$$EXTRACT=1 \text{ if } y(n-C,N)>S_k(n,N) \quad (8)$$

During the calculations a suitable logic circuit proceeds to control possible overflow errors.

The most significant part of the invention resides in the fact that the filter FIR is partially programmable, which allows a high degree of flexibility, changing the coefficients and the distance of the cells which intervene in the arithmetic calculations. The coefficients C1 and C2 which can assume the values +1 and -1 are programmable; the distance of the cells which intervene in the algorithm is also programmable ("a" and "b") with the limitations visible in FIG. 1. This allows the modification either of the nature of the filter type, derivation, integration, etc, or the adaptation of the same filter system to the width attained by the impulse, in relation to the punctiform sources. In conclusion, it is possible to vary the filter type and to adapt the same filter to the real form of the real punctiform IR signal, which depends on the electro-optic characteristics of the sensor.

Thus the characteristic feature of the filter is its flexibility of use and the possibility to manage in parallel sixteen and more different channels.

The FIR has the task to maximize the rate signal/noise; the ATD has the task of carrying out the detection at a constant rate of false alarms and has a flexibility which complements the usage flexibility of the filter FIR through the possibility to select the pointers $n_1, \ldots n_4$ and of the laws of threshold calculation.

What is claimed is:

1. A preprocessor for use in electronic apparatus, which consists essentially of an input interface; a transversal filter connected by a bus to the input interface; a device with adaptable threshold connected by at least one bus with the filter and by at least one bus with the input interface; an assembly of resources connected by a bus with the input interface, and an output interface connected by respective buses with said device and said assembly of resources, said device with adaptable threshold comprising an internal memory, and an arithmetic processing unit, said assembly of resources comprising a complex of counters and comparators and being connected to an external controller, said output interface being provided with means for acquiring angular reference data, the entire preprocessor being a chip capable of presenting a calculated integration in less than sixty thousand cells, said transversal filter comprising means a register and a plurality of multipliers and adders connected to said register for calculating a function of the type y(n, N)=[c1*x(n,N)+x(n–a,N)]+[x(n–a–2,N)+c2*x(n–b,N)] for N=16 channels and where x(n,N) represents input data in the filter at the moment of calculation for N.

2. The preprocessor for use in electronic apparatus according to claim 1 which is a CHIP-ASIC and is provided in a receiver detecting false alarms at a constant rate.

3. The preprocessor for use in electronic apparatus according to claim 1 configured for civil and military passive surveillance.

* * * * *